(12) United States Patent  
Kramer et al.

(10) Patent No.: US 9,969,206 B2  
(45) Date of Patent: May 15, 2018

(54) MARKER STORAGE ACCESSORY

(71) Applicant: Kablooe Design, Inc., Minneapolis, MN (US)

(72) Inventors: Thomas Edward Kramer, Andover, MA (US); Blake Thomas Eisenschenk, Ham Lake, MN (US); Luke William Bromback, Lake Elmo, MN (US)

(73) Assignee: Kablooe Design, Inc., Minneapolis, MN (US)

( * ) Notice: Subject to any disclaimer, the term of this patent is extended or adjusted under 35 U.S.C. 154(b) by 228 days.

(21) Appl. No.: 14/867,667

(22) Filed: Sep. 28, 2015

(65) Prior Publication Data

US 2017/0087921 A1    Mar. 30, 2017

(51) Int. Cl.
| | |
|---|---|
| *B43K 23/00* | (2006.01) |
| *F16B 1/00* | (2006.01) |
| *B43K 8/02* | (2006.01) |
| *F16B 47/00* | (2006.01) |

(52) U.S. Cl.
CPC .............. *B43K 23/001* (2013.01); *B43K 8/02* (2013.01); *F16B 1/00* (2013.01); *F16B 47/00* (2013.01); *F16B 2001/0035* (2013.01)

(58) Field of Classification Search
CPC combination set(s) only.
See application file for complete search history.

(56) References Cited

U.S. PATENT DOCUMENTS

| | | | |
|---|---|---|---|
| 2,205,929 A | 6/1940 | Musgrave | |
| 2,594,955 A | 4/1952 | Markowitz | |
| 2,644,212 A | 7/1953 | Markowitz | |
| 3,159,372 A | 12/1964 | McIntosh | |
| 5,855,442 A | 1/1999 | Keller | |
| 5,957,603 A | 9/1999 | Bell | |
| 5,975,783 A * | 11/1999 | Hu | B43K 23/128 401/202 |

(Continued)

FOREIGN PATENT DOCUMENTS

| | | |
|---|---|---|
| GB | 715031 | 9/1954 |
| JP | 2002347386 A | 12/2002 |

(Continued)

*Primary Examiner* — David Walczak
(74) *Attorney, Agent, or Firm* — Craig J. Lervick; Larkin Hoffman Daly & Lindgren, Ltd.

(57) ABSTRACT

A marker storage accessory includes a main body having marker-engaging structure and writing surface engaging structure. The main body may also include cap-engaging structure or, alternatively, blocking structure. The marker-engaging structure includes a plurality of circumferentially positioned teeth adapted to be conformingly inserted into the complementarily shaped channels defined by the ribs located on the non-writing end of a writing instrument such as a dry-erase marker. The cap-engaging structure can include ribs creating a geometry adapted to conformingly receive the protruding end of a cap for the writing instrument. The blocking structure can be a protrusion adapted to prevent attachment of the marker storage accessory on the nub-end of the writing instrument while permitting attachment of a marker cap. When the marker storage accessory is attached to the writing surface, the marker self-positions to a generally nub-down orientation.

19 Claims, 9 Drawing Sheets

(56) References Cited

U.S. PATENT DOCUMENTS

| | | |
|---|---|---|
| 6,033,139 A | 3/2000 | Dutcher |
| D441,021 S | 4/2001 | Roush |
| 6,269,960 B1 | 8/2001 | Harp |
| 6,347,898 B1 | 2/2002 | Rhodes et al. |
| 6,505,984 B2 | 1/2003 | Smith et al. |
| 6,745,907 B2 | 6/2004 | Kjelgaard |
| D493,832 S | 8/2004 | Hung |
| 6,932,531 B2 | 8/2005 | Marschand et al. |
| D534,211 S | 12/2006 | Kent et al. |
| 7,219,869 B1 | 5/2007 | Whittington |
| 7,252,450 B2 | 8/2007 | Aguirre et al. |
| 7,322,766 B2 * | 1/2008 | Erlebacher ............. B43K 29/20 401/195 |
| 7,350,996 B2 | 4/2008 | Bielecki et al. |
| D569,428 S | 5/2008 | Qiu |
| D597,598 S | 8/2009 | Ma |
| D605,696 S | 12/2009 | Ma |
| 7,722,275 B2 | 5/2010 | Erlebacher et al. |
| 7,896,520 B1 * | 3/2011 | Norling ............... A47J 37/0786 362/191 |
| 8,146,534 B1 * | 4/2012 | Robertson ............ A01K 5/0114 119/61.54 |
| D667,499 S | 9/2012 | Lira-Nunez et al. |
| D685,421 S | 7/2013 | Jiang |
| 9,662,926 B1 * | 5/2017 | Boettcher ............ B43K 23/001 |
| 2003/0197104 A1 | 10/2003 | Heybl et al. |
| 2008/0166173 A1 | 7/2008 | Gibbons |
| 2010/0054846 A1 | 3/2010 | Hartman |
| 2010/0080645 A1 | 4/2010 | Wu |
| 2012/0003030 A1 | 1/2012 | Kish et al. |
| 2014/0112696 A1 | 4/2014 | Osborne |
| 2015/0165813 A1 | 6/2015 | Martin |

FOREIGN PATENT DOCUMENTS

| | | |
|---|---|---|
| JP | 4072086 B2 | 4/2008 |
| WO | 2003007755 A1 | 1/2003 |

* cited by examiner

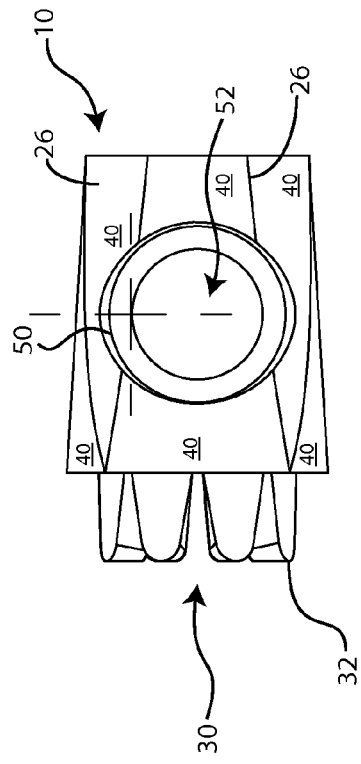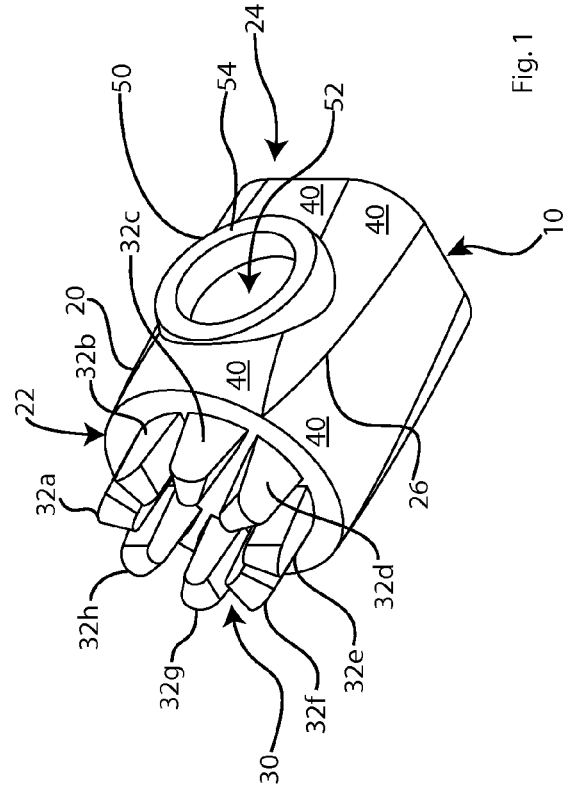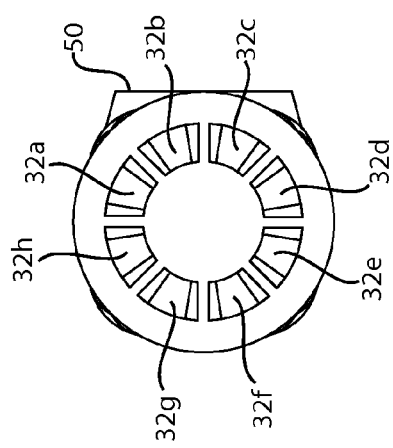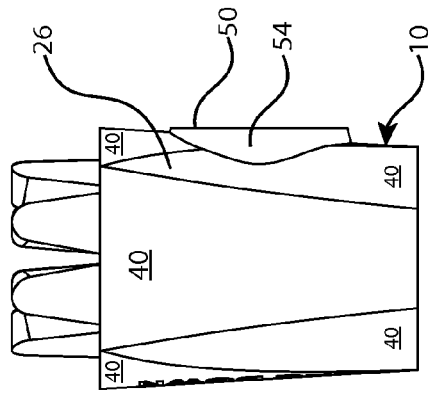

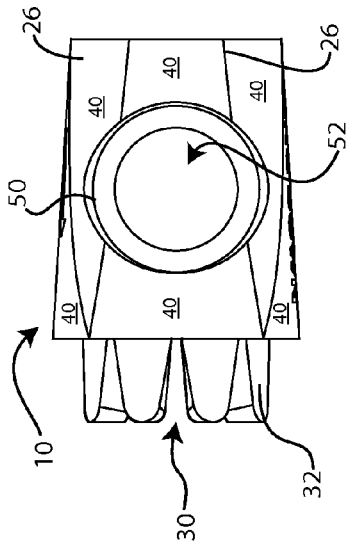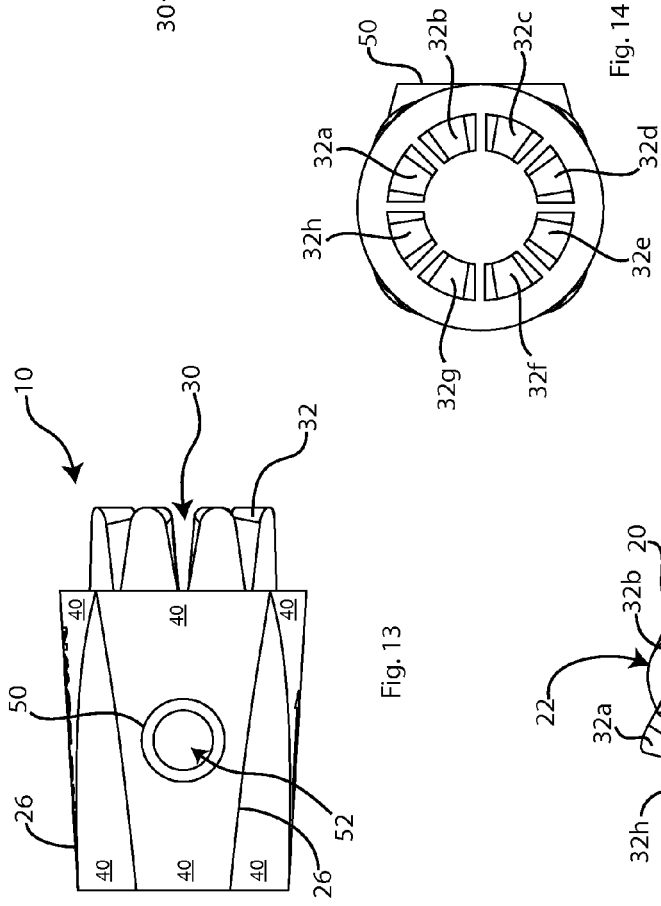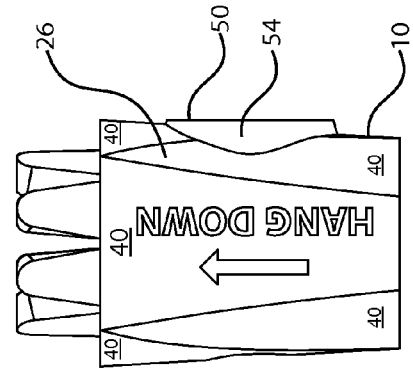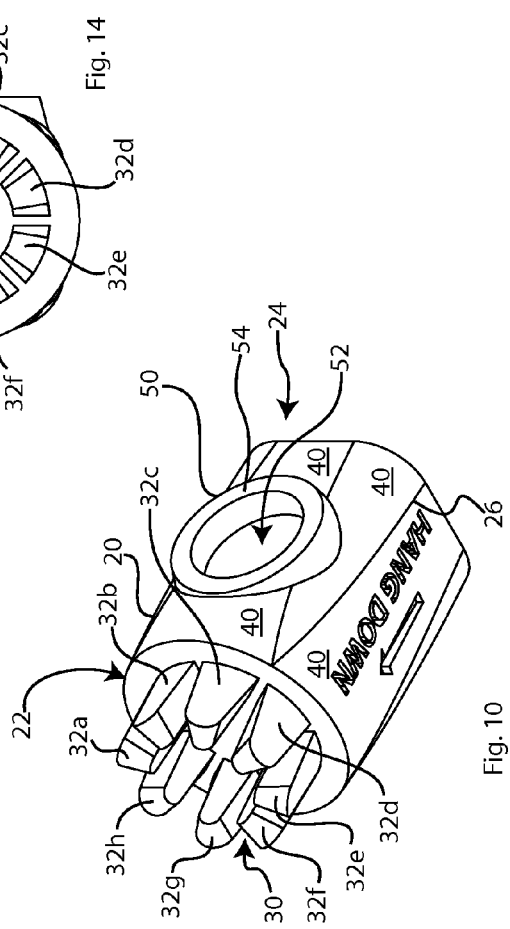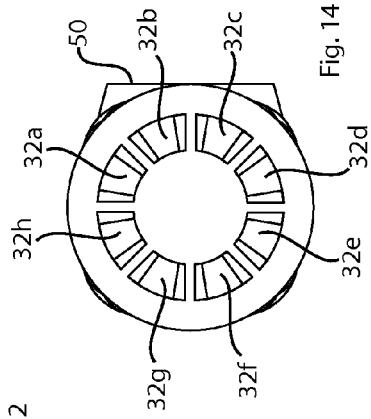

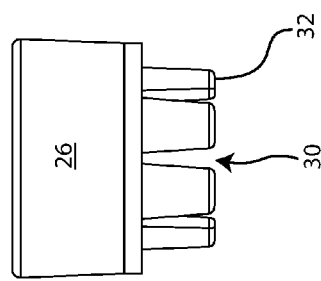
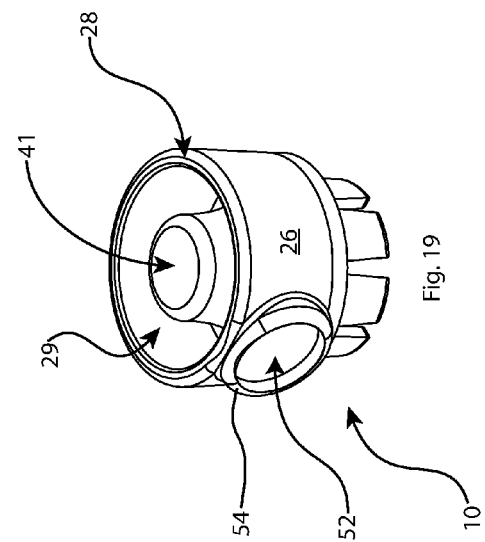
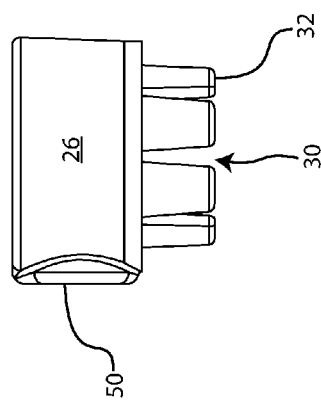
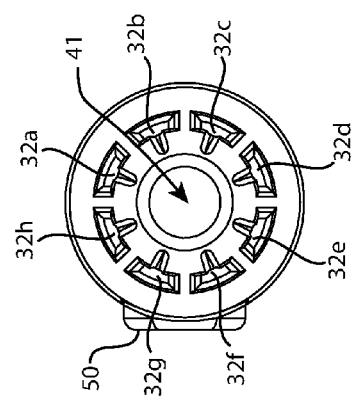

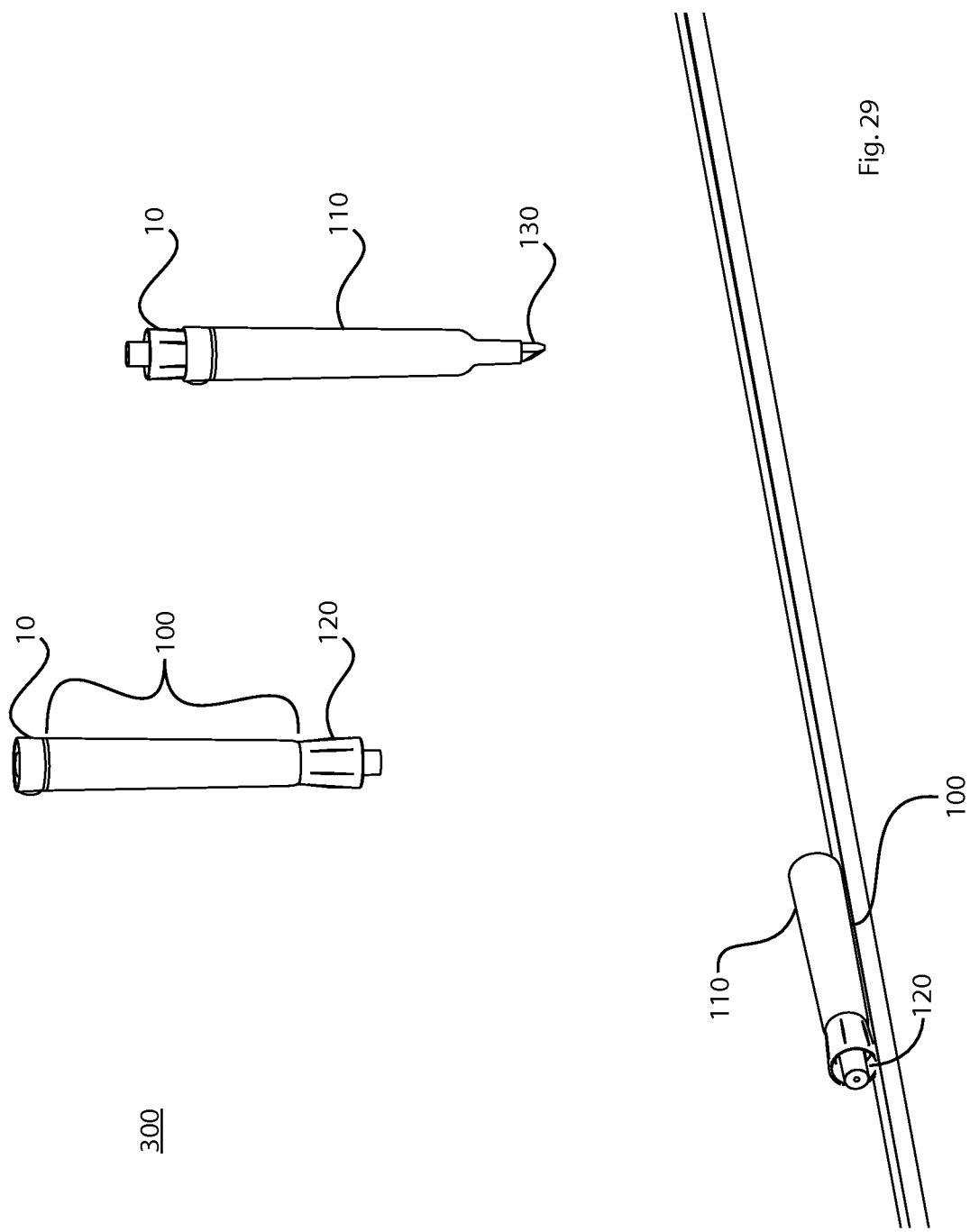

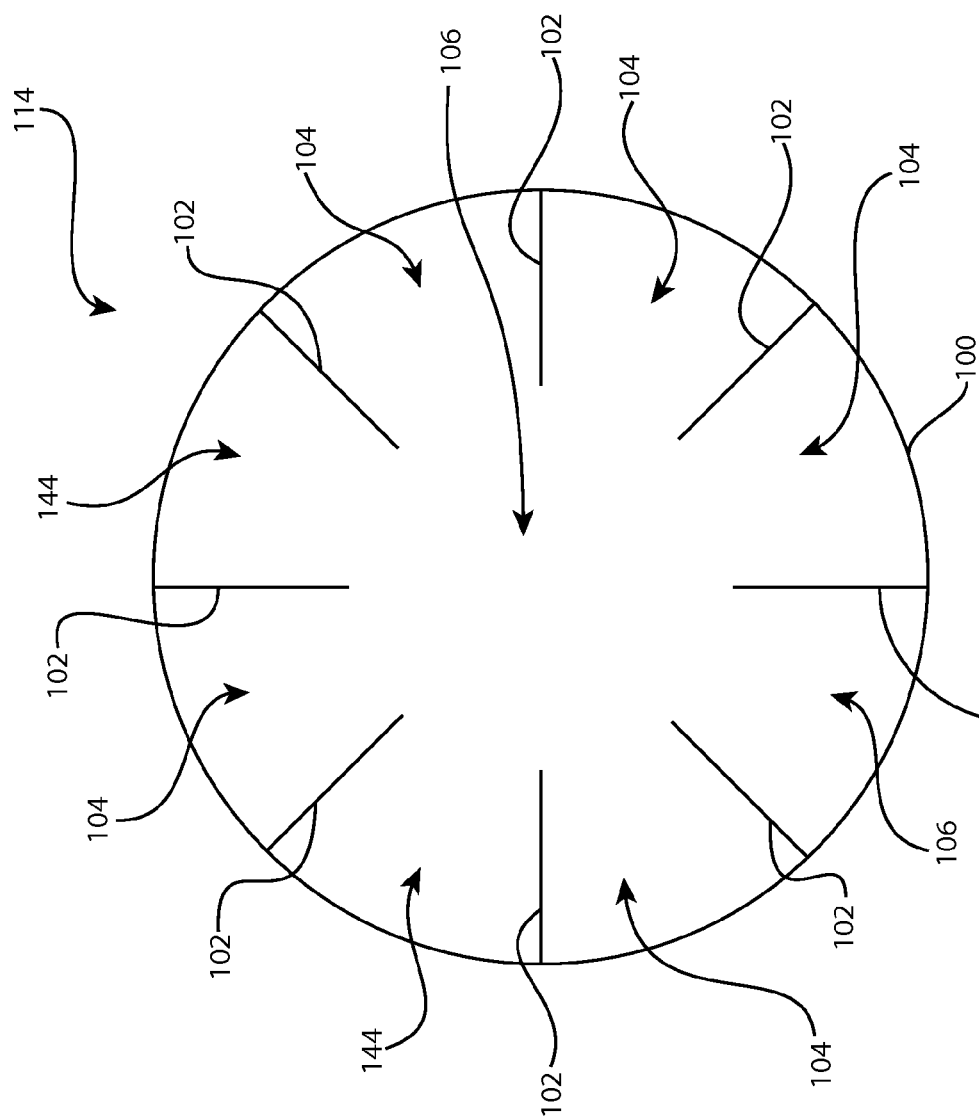

MARKER STORAGE ACCESSORY

BACKGROUND

Writing instruments are frequently misplaced. Writing instruments are also often stored in a manner that reduces their effectiveness and overall useful lifespan. As a result, many writing instruments must be replaced before they otherwise should be. This results in increased waste and unnecessary costs. It can also significantly inconvenience a user who is unable to locate or use a writing instrument when needed.

Markers for dry-erase boards (also known as white boards) are especially susceptible to premature expiration. This is due, in part, to the fact that the writing surface of a dry-erase board is normally mounted vertically on a wall. To accommodate the convenient storage of dry-erase markers, dry-erase boards frequently include a generally horizontal storage surface. Dry-ease markers are then placed on this shelf-like surface and stored horizontally for later use. Due to the way in which most dry-erase markers function, however, horizontal storage tends to diminish their effectiveness.

In particular, most dry-erase markers include a nub made from a felt-like material. The material generally extends into the interior of a body marker. Inside the marker body, the material is surrounded by a substantially liquid-impermeable material, such as a polymer, thereby creating an ink reservoir. As the dry-erase marker is used and ink is transferred from the nub to a writing surface, gravity and capillary action draw ink toward the nub from the reservoir. While this design is generally functional and low-cost, its effectiveness can be compromised when the dry-erase marker is not stored in a nub-down orientation.

Storing dry-erase markers on horizontal white-board shelves or on other horizontal surfaces, such as in desk drawers, reduces their effectiveness and useful lifespan by inhibiting the transfer of ink from the ink reservoir to the nub. Although a number of devices exist to facilitate storage of dry-erase markers, they suffer from several drawbacks. Some such storage devices can be used to store dry-erase markers in a vertical, nub-down orientation, but they are prone to user error resulting in the dry-eraser markers being stored horizontally or, worse, in a nub-up orientation. Also, most dry-erase marker storage devices cannot themselves be conveniently stored when not in use. For example, when a dry-erase marker is removed for use, the storage device generally remains in place. If the storage device is affixed to the dry-erase board, this limits or otherwise detracts from the user's ability to use the entire surface dry-erase board (i.e. it takes up space otherwise usable by the user). Alternatively, if the storage device is stored away from the dry-erase board, using dry-erase markers is more burdensome. In addition, many storage devices accommodate several dry-erase markers simultaneously. If the user only wishes to store a single dry-erase marker, however, the storage accessory occupies unneeded space and can appear obtrusive.

A marker storage accessory is therefore needed that addresses the aforementioned drawbacks.

SUMMARY

Embodiments of the marker storage accessory of the present invention substantially meet the aforementioned needs for storing a writing instrument such as a dry-erase marker. In an embodiment, the marker storage accessory has a main body including marker-engaging structure and writing surface-engaging structure. The main body may also include cap-engaging structure and/or blocking structure.

Markers of many types, including dry-erase markers, highlighters, permanent markers, etc. often include a receiving structure at the non-writing end. One well-accepted configuration includes a number of "fins" or "ribs" extending inwardly within a cylindrical chamber. This structure allows the cap to be inserted/stored when not in use. The marker-engaging structure of the marker storage accessory includes a plurality of circumferentially positioned teeth. The teeth are adapted to be conformingly inserted into the complementary channels located in the non-writing end of a writing instrument such as a dry-erase marker. The teeth then engage the "fins" which exist in most current markers. The surface-engaging structure generally functions by means of a magnet or suction cup and permits the marker storage accessory body to rotate in relation to the writing surface. The cap-engaging structure can include ribs creating a geometry adapted to conformingly receive the protruding end of a cap for the writing instrument. The blocking structure can be a protrusion adapted to prevent attachment of the marker storage accessory on the nub-end of the writing instrument while permitting attachment of a marker cap, thereby inhibiting improper use of the marker storage accessory that could result in a nub-up orientation during storage.

The marker storage accessory can generally be removably attached to the non-writing end of a writing instrument such as a dry-erase marker. The marker storage accessory can also be removably attached to a writing surface such as a dry-erase board. When the marker storage accessory is attached to a marker and the writing surface, the marker storage accessory positions the marker to a generally nub-down orientation.

BRIEF DESCRIPTION OF THE DRAWINGS

FIG. 1 is perspective view of an embodiment of a marker storage accessory;

FIG. 2 is a plan view of the marker storage accessory illustrated in FIG. 1;

FIG. 3 is a plan view of the marker storage accessory illustrated in FIG. 1;

FIG. 4 is a bottom view of the marker storage accessory illustrated in FIG. 1;

FIG. 10 is a perspective view of an embodiment of a marker storage accessory;

FIG. 11 is a plan view of the marker storage accessory illustrated in FIG. 10;

FIG. 12 is a plan view of the marker storage accessory illustrated in FIG. 10;

FIG. 13 is a plan view of the marker storage accessory illustrated in FIG. 10;

FIG. 14 is a bottom view of the marker storage accessory illustrated in FIG. 10;

FIG. 19 is a perspective view of an embodiment of a marker storage accessory;

FIG. 20 is a plan view of the marker storage accessory illustrated in FIG. 19;

FIG. 21 is a plan view of the marker storage accessory illustrated in FIG. 19;

FIG. 22 is a bottom view of the marker storage accessory illustrated in FIG. 19;

FIG. 29 is an illustration of an embodiment of marker storage accessories in use with writing instruments and a writing instrument; and FIG. 30 is a bottom view of a dry-erase marker.

DESCRIPTION OF THE PREFERRED EMBODIMENTS

A marker storage accessory 10 is depicted generally in FIGS. 1-22. Although marker storage accessory 10 can be used for any number of purposes, the illustrated embodiments are especially suitable for removable attachment to a writing instrument, such as marker 100, as shown in FIGS. 23-28. Marker storage accessory 10 may be particularly useful for storing a dry-erase marker 100 in a nub-down orientation, and positioning or attaching to a writing surface 300 such as a dry-erase board, as depicted in FIG. 29.

Figure 16:
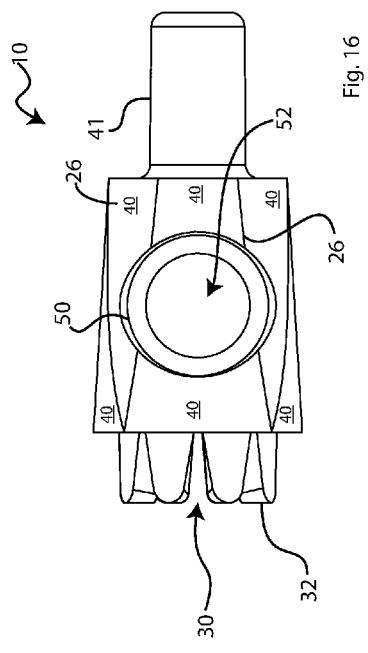
FIG. 16 is a plan view of the marker storage accessory illustrated in FIG. 15.
Figure 15:
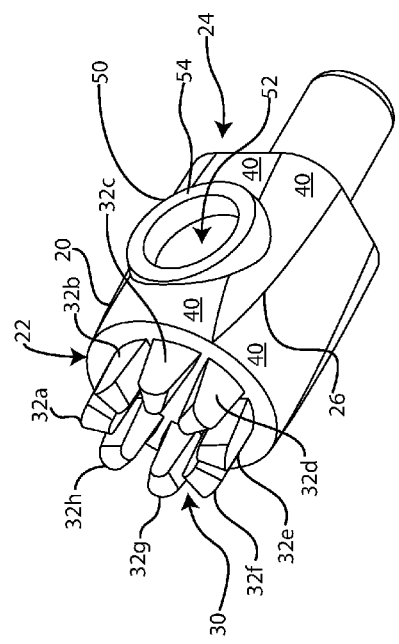
FIG. 15 is perspective view of an embodiment of a marker storage accessory.
Figure 18:
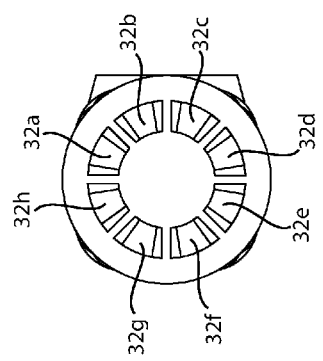
FIG. 18 is a bottom view of the marker storage accessory illustrated in FIG. 15.
Figure 17:
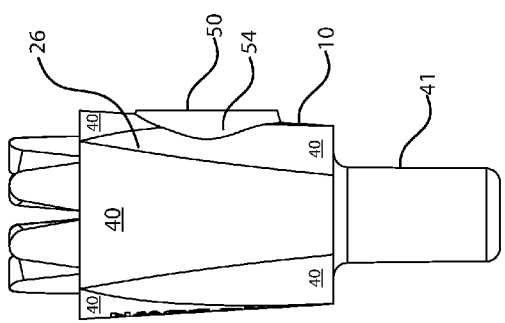
FIG. 17 is a plan view of the marker storage accessory illustrated in FIG. 15.
Figure 23:
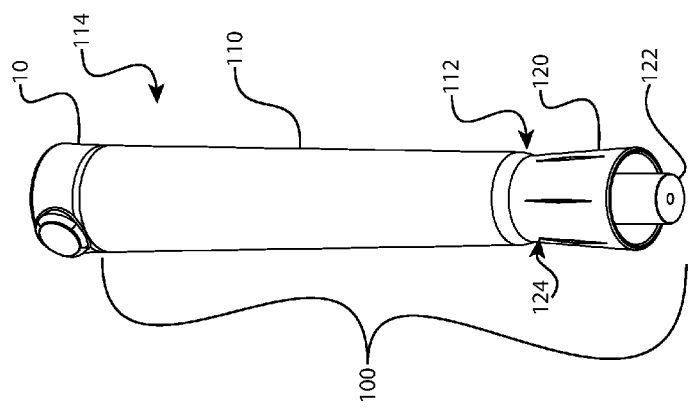
FIG. 23 is a perspective view of a combination of an embodiment of a marker storage accessory and a marker.
Figure 25:
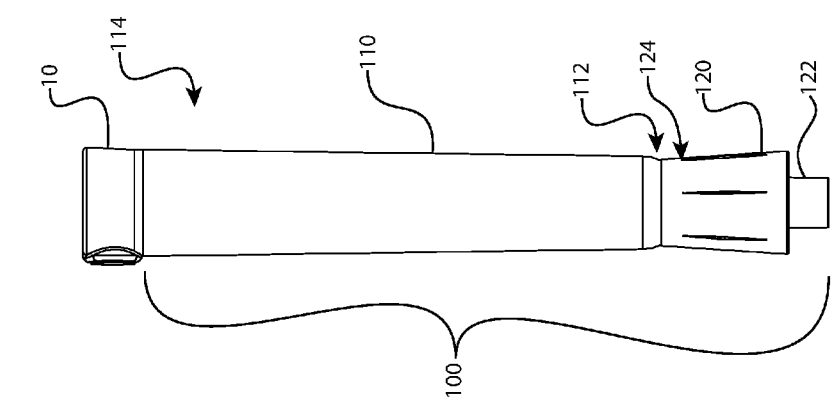
FIG. 25 is a plan view of the combination of the marker storage accessory and the marker of FIG. 23.
Figure 24:
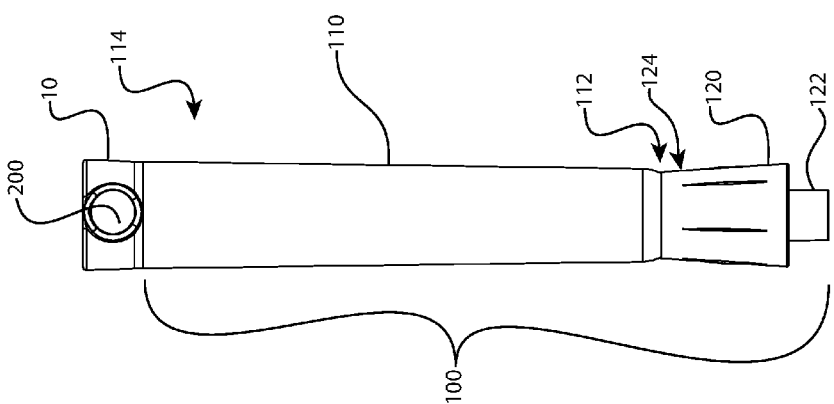
FIG. 24 is a plan view of the combination of the marker storage accessory and the marker of FIG. 23.
Figure 26:
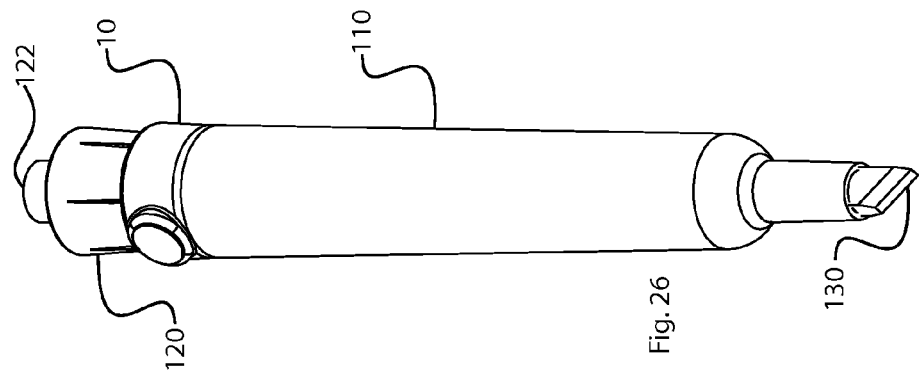
FIG. 26 is a perspective view of a combination of an embodiment of a marker storage accessory and a marker with a marker cap in a stowed position.
Figure 28:
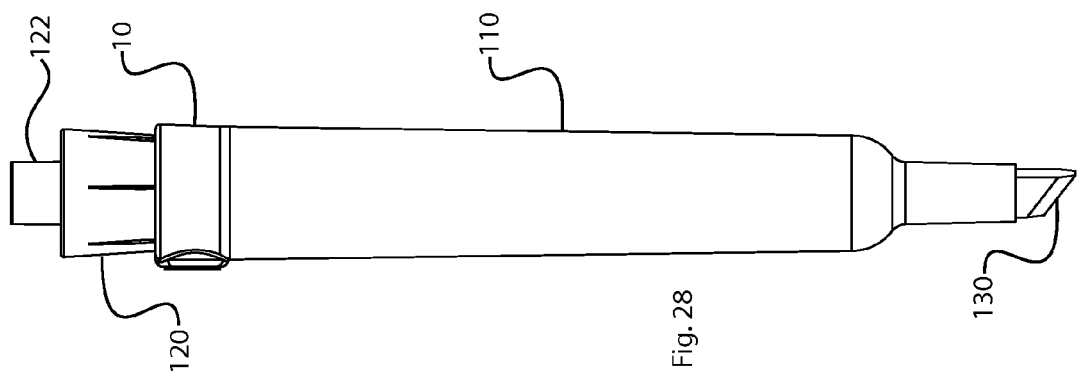
FIG. 28 is a plan view of the combination of the marker storage accessory and the marker of FIG. 26 with the marker cap in the stowed position.
Figure 27:
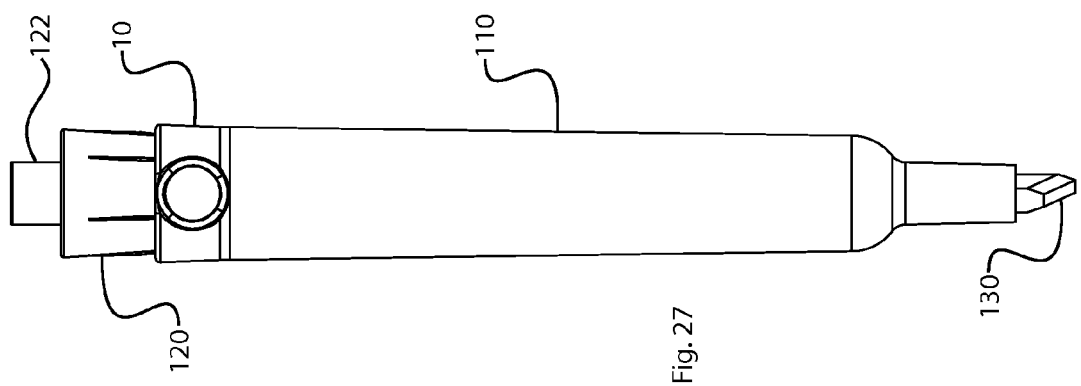
FIG. 27 is a plan view of the combination of the marker storage accessory and the marker of FIG. 26 with the marker cap in the stowed position.

Referring to FIGS. 1, 5, 10, 15, and 19, marker storage accessory 10 includes body 20 having first end 22, second end 24, and gripping surface 26. First end 22 has marker-engaging structure 30. Second end 24 may include cap-receiving structure 28. Alternatively, second end 24 may include a protrusion or blocking structure 41, as depicted in FIGS. 15-17. As yet another alternative second end 24 may include cap-receiving structure 28 and blocking structure 41, as best illustrated in FIG. 19. Marker storage accessory 10 also include one or more couplers for attachment to writing surface 300, such as surface-engaging structure 50 partially embedded within or attached to gripping surface 26.

Referring to FIGS. 1-22, marker-engaging structure 30 comprises a plurality of protrusions or teeth 32. Referring also to FIG. 30, which illustrates a second end 114 of marker 100 teeth 32 are adapted to conformingly fit into spaces 104 formed from ribs 102 of marker 100. Although any number of teeth 32 are possible, marker-engaging structure 30 will generally include the same number of teeth 32 as there are spaces 104 in second end 114 of marker 100. In an embodiment, marker storage accessory 10 will include eight teeth 32a-h, as depicted in FIGS. 1, 4, 5, 9, 10, 14, 15, 18, 19, and 22.

Teeth 32 generally have slightly larger widths than the widths of the corresponding spaces 104 of marker 100. The relatively larger width of teeth 32 ensures a compression fit with second end 114 of marker 100. The tightness of the fit, as measured by separation strength (defined herein as the force required to separate two objects that are attached to each other), between marker storage accessory 10 and second end 114 of marker 100 can be varied by changing the dimensions of teeth 32 in relation to spaces 104.

Cap-receiving structure 28 at second end 24 of marker storage accessory 10 can be configured in any number ways. In an embodiment, cap-receiving structure 28 includes blocking structure 41 to define circular channel adapted to receive cap 120 of marker 100, as shown in FIG. 19. In another embodiment, cap-receiving structure 28 is identical or substantially similar to second end 114 of marker 100, as generally illustrated in FIG. 30. In this sense, cap-receiving structure includes ribs 102 defining spaces 104 and central channel 106. Ribs 102 can be adapted such that spaces 104 conformingly receive teeth 32 or similar structure. Ribs 102 can similarly be adapted such that central channel 106 conformingly receives protrusion 122 of cap 120.

As with teeth 32, the dimensions of ribs 102 can be varied to alter the tightness of the fit, as measured by separation strength, between marker storage accessory 10 and cap 120. The separation strength of marker storage accessory 10 and marker 100 can be greater, equal to, or less than the separation strength of marker storage accessory 10 and cap 120. In an embodiment, teeth 32 and ribs 102 of marker storage accessory 10 are configured such that the separation force required to separate marker storage accessory 10 from second end 114 of marker 100 is greater than the separation force required to separate cap 120 marker storage accessory 10. This allows a user holding body 110 of marker 100 to detach cap 120 from marker storage accessory 10 without inadvertently detaching marker storage accessory 10 from body 110 of marker 100. In a further embodiment, the separation strength of marker storage accessory 10 and marker 100 is approximately one to five times (1×-5×) greater than the separation strength of marker storage accessory 10 and cap 120.

Surface-engaging structure 50 of marker storage accessory 10 generally has aperture 52. As shown in FIGS. 1-3 and 10-12, aperture 52 may be defined by raised housing 54 designed to increase the profile of surface-engaging structure 50. Marker storage accessory 10 may include one surface-engaging structure 50, as shown in FIGS. 1-9. Alternatively, marker storage accessory 10 may include two or more surface-engaging structures 50, as in the embodiment depicted in FIGS. 10-13.

In an embodiment, aperture 52 is adapted to receive magnet 200. In another embodiment, aperture 52 is adapted to receive a suction device (not depicted), such as a suction cup. Marker storage accessory 10 may also include a swivel mount (not shown) and/or a gimbal mechanism (not shown) to facilitate rotation of marker storage accessory 10 in relation to writing surface 300 (i.e. about an axis substantially perpendicular to both surface 300 and marker storage accessory 10). In an embodiment, gimbal mechanism is adapted to function in conjunction with an embodiment of surface-engaging structure 50 incorporating a suction cup and swivel mount is adapted to with an embodiment of surface-engaging structure incorporating magnet 200.

Embodiments of marker storage accessory 10 having two or more surface-engaging structures 50 may include any combination of magnets 200 or suction devices. As depicted in FIGS. 10-13, marker storage accessory includes structures to accommodate both a suction cup and magnet 200, thus allowing flexibility when contemplating attachment of marker storage accessory 10 to a variety of surfaces. Marker storage accessory 10 can thereby be attached to both metallic and non-metallic surfaces. Both magnet 200 and gimbaled suction cup permit marker storage accessory 10 to pivot around an axis generally defined by aperture 52.

Figure 6:
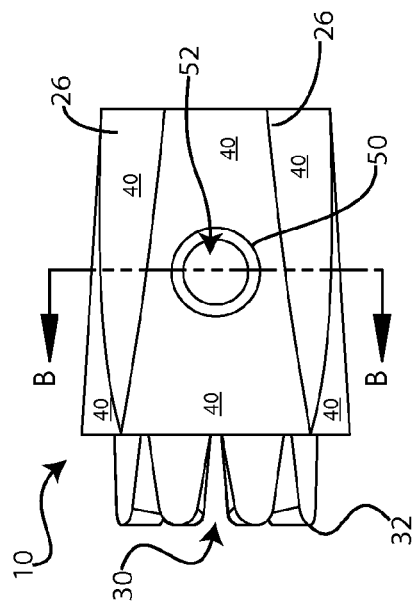
FIG. 6 is a plan view of the marker storage accessory illustrated in FIG. 5.
Figure 5:
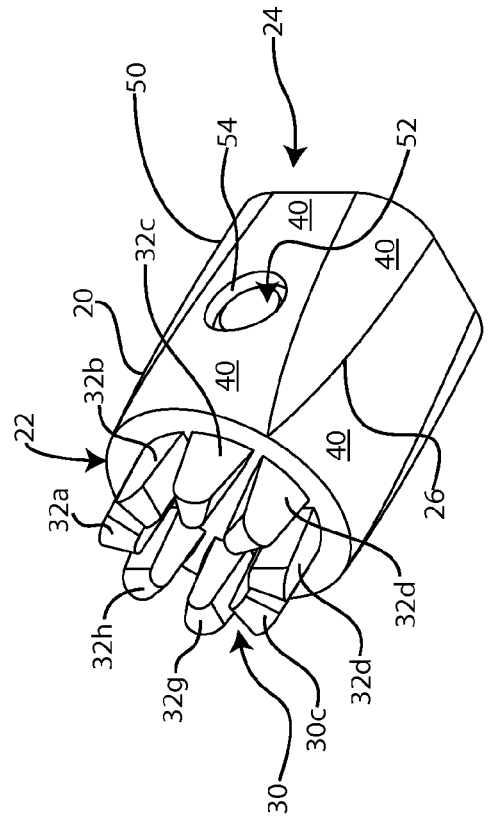
FIG. 5 is a perspective view of an embodiment of a marker storage accessory.
Figure 7:
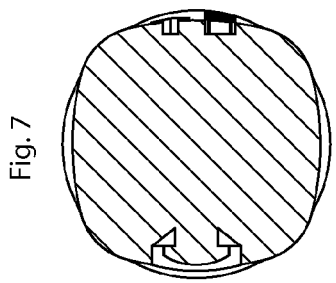
FIG. 7 is a cross-sectional plan view of the marker storage accessory illustrated in FIG. 5.
Figure 9:
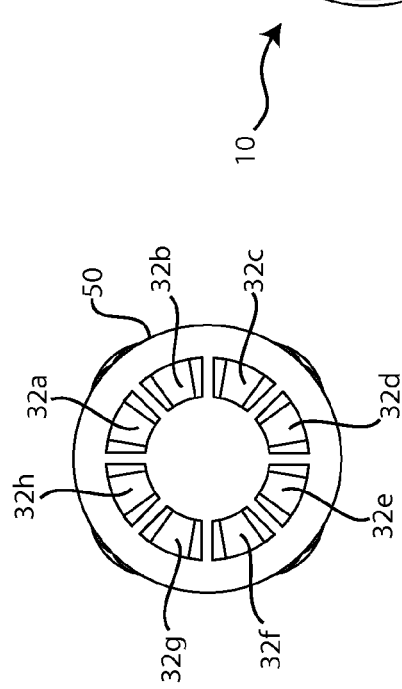
FIG. 9 is a bottom view of the marker storage accessory illustrated in FIG. 5.
Figure 8:
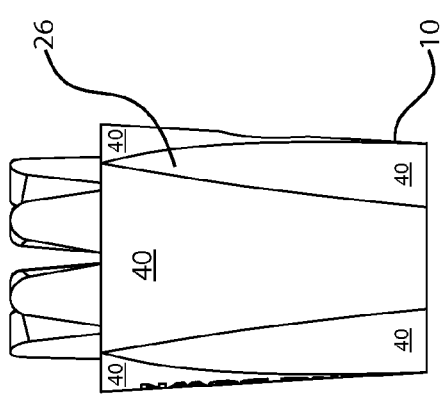
FIG. 8 is a plan view of the marker storage accessory illustrated in FIG. 5.

As best illustrated in FIGS. 5-6 and 8, gripping surface 26 may be formed from multiple conjoined angled surfaces 40. Such angled surfaces 40 are generally configured to facilitate grasping of marker storage accessory 10 by a user. This configuration can be useful in removing marker storage accessory 10 from marker 100. Specifically, angled surfaces 40 provide increased surface area for gripping marker storage accessory 10 and applying the necessary force to separate marker storage accessory 10 from marker 100. Gripping surface 26, such as on one of angled surfaces 40, may include indicia directed as instructing a user how and where to attached marker storage accessory on body 110 of marker 100. The indicia may include, for example, arrows indicating the direction in which marker 100 should hang to achieve optimal performance. The indicia may also include written instructions, such as the words "HANG DOWN".

Marker storage accessory 10 can be manufactured from any number of materials. Generally, marker storage accessory 10 will be manufactured from a low-cost, lightweight material exhibiting semi-elastic characteristics while maintaining rigidity. In an embodiment, body of 20 is made from a polymer. Materials for surface-engaging structure 50 will depend on the selected design (i.e., magnet or swivel-suction), and can include a combination thereof.

The length and width of marker storage accessory 10 can be varied to accommodate any number of different types and configurations of writing instruments. Generally speaking, the dimensions will be consistent with the writing instrument involved. The width of marker storage accessory may be between approximately 0.5 inches and 2.0 inches. In an embodiment, the width of second end 24 of marker storage accessory 10 is approximately 0.78 inches. One skilled in the art will recognize that the width of marker storage accessory 10 may be consistent or vary along the length of body 20. In an embodiment, the width of body 20 increases from second end 24 toward first end 22.

The length of marker storage accessory 10 can be in the range of approximately 0.40 inches to approximately 5.0 inches, including a body 20 having a length in the range of approximately 0.2 inches to approximately 4.75 inches, and the length of teeth can be in the range of approximately 0.10 inches to approximately 0.50 inches. In an embodiment, the length of marker storage accessory 10 is approximately 1.15 inches, the length of body is approximately 0.90 inches, and the length of teeth is approximately 0.25 inches. In another embodiment, the length of the length of marker storage accessory 10 is approximately 0.67 inches, the length of body is approximately 0.42 inches, and the length of teeth is approximately 0.25 inches. Each of the aforementioned embodiments may also include blocking structure 41. The length of blocking structure 41 can be between approximately, 0.20 inches to approximately 3.0 inches, or approximately 0.59 inches. One skilled in the art will recognize that the aforementioned dimensions of body 20 may either include the length of blocking structure 41 or may necessarily be increased based on the length of blocking structure 41.

The dimensions of surface-engaging structure 50 may also be varied to accommodate different types and sizes of components for attaching marker storage accessory 10 to writing surface 300. The diameter of aperture 52 may be in the range of approximately 0.10 inches to approximately 0.6 inches. In an embodiment, the diameter of aperture 52 is approximately 0.32 inches to 0.40 inches, or approximately 0.37 inches.

In use, marker storage accessory 10 is attached to second end 114 of body 110 of marker 100. Specifically, teeth 32 at first end 22 of marker storage accessory 10 engage spaces 104 in second end 114 of marker 100. In an embodiment, blocking structure 41 prevents marker storage accessory 10 from being attached to first end 112 of body 110 of marker 100.

Cap 120 is removed from first end 112 of marker 100, thereby exposing nub 130, or writing tip, of marker 100. Cap 120 can then be stored on marker storage accessory 10 by inserting projection 122 into a central channel (configured the same as central channel 106 illustrated in FIG. 30), at second end 22 of marker storage device 10. Alternatively, and as best illustrated in FIGS. 19 and 26-28, cap 120 can be attached by placing an edge portion 124 of cap 120 into a recess 29 within storage accessory 10. With nub 130 exposed and cap 120 safely secured, user can use marker 100 as desired.

When use of marker 100 is completed, user can grip gripping surface 26 of cap 120 and exert a separation force. In embodiments of maker storage accessory 10 wherein the separation force required to separate marker storage accessory 10 from second end 114 of marker 100 is greater than the separation force required to separate marker storage accessory 10 from cap 120, cap 120 will separate from marker storage accessory 10 while marker storage accessory 10 remains attached to second end 114 of marker 100. Cap 120 can then be reattached to first end 112 of marker 100.

Marker storage accessory 10 is then configured to be attached to writing surface 300 using surface-engaging structure 50. As surface-engaging structure is located distal to the center of gravity of marker 100 (including when marker storage accessory 10 is attached marker 100), marker will rotate about the axis defined by the location of aperture 52 of surface-engaging structure 50 such that marker 100 is positioned in a substantially nub-down orientation when attached to writing surface 300, as depicted in FIG. 29. As previously described, blocking structure 40 can inhibit or prevent a user from attaching marker storage accessory 10 to first end 112 of marker 100.

Various embodiments of the invention have been described above for purposes of illustrating the details thereof and to enable one of ordinary skill in the art to make and use the invention. The details and features of the disclosed embodiment(s) are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. An accessory for use with a writing instrument to allow removable attachment to a substantially vertically oriented writing surface, the accessory comprising:

a body portion;
a plurality of teeth extending from a first end of the body portion, the plurality of teeth adapted to be received within a plurality of channels located within an end of the writing instrument; and
a coupler substantially integrated into the body portion, the coupler being removably attachable to the substantially vertically oriented writing surface.

2. The accessory of claim 1, wherein the plurality of teeth are adapted to mate with a receiving structure at the end of the writing instrument, with the receiving structure including spaces formed between a plurality of ribs at the first end of the writing instrument, wherein at least one of the plurality of ribs is retained between two adjacent ones of the plurality of teeth.

3. The accessory of claim 2, wherein the plurality of teeth are positioned circumferentially at a first end of the body portion.

4. The accessory of claim 1, wherein the accessory is couplable to the writing surface along an axis substantially perpendicular to the writing surface, the coupler being adapted to permit the body portion to rotate about the axis with respect to the writing surface.

5. The accessory of claim 4, wherein the accessory is configured so that, when combined with the writing instrument, the accessory is able to rotate to a position wherein the writing instrument is positioned in a substantially nub-down orientation in which the nub is below the center of gravity of the writing instrument when the accessory is attached to the writing surface.

6. The accessory of claim 5, further comprising structure adapted to releasably receive a portion of a cap for the writing instrument.

7. The accessory of claim 6, wherein the cap receiving structure is configured so that separating the cap from the accessory requires exertion of a cap-separating force and separating the writing instrument from the accessory requires exertion of an instrument-separating force, the instrument-separating force being greater than the cap-separating force.

8. The accessory of claim 7, wherein the instrument-separating force is at least twice as great as the cap-separating force.

9. The accessory of claim 8, wherein the body portion includes an indicia of the direction in which the nub should be oriented when the accessory is attached to the writing surface.

10. The accessory of claim 6, wherein the cap receiving structure includes a protrusion that impedes attachment of the accessory to a second end of the writing instrument.

11. The accessory of claim 5, wherein the coupler includes a swivel mount and a magnet.

12. The accessory of claim 5, wherein the coupler includes a gimbal and a suction cup.

13. A writing instrument comprising:
a nub;
a writing instrument body;
a cap attachable to the writing instrument so as to cover the nub; and
an attachment accessory comprising:
a body portion;
a plurality of teeth adapted to mate with a plurality of ribs positioned within a first end of the writing instrument; and
a coupler substantially integrated into the body portion, the coupler being removably attachable to a substantially vertically oriented writing surface.

14. The writing instrument of claim 13, wherein the plurality of teeth are positioned circumferentially at a first end of the body portion and adapted to mate with the first end of the writing instrument, the plurality of teeth configured to be received within a plurality of channels at the first end of the writing instrument, wherein the plurality of channels are defined by the plurality of ribs in the first end of the writing instrument, and the plurality of ribs are captured between the plurality of teeth.

15. The writing instrument of claim 14, wherein:
the writing instrument defines a center of gravity;
the accessory is couplable to the writing surface along an axis substantially perpendicular to the writing surface; and
the coupler is adapted to permit the body portion rotate about the axis with respect to the writing surface such that the writing instrument is self-adjustable to a substantially nub-down orientation in which the nub is below the center of gravity of the writing instrument when the accessory is attached to the writing surface.

16. The writing instrument of claim 15, wherein the attachment accessory further comprises structure adapted to releasably receive a portion of the cap.

17. The writing instrument of claim 16, wherein separating the cap from the accessory requires exertion of a cap-separating force and separating the writing instrument from the accessory requires exertion of an instrument-separating force, the instrument-separating force being greater than the cap-separating force.

18. An accessory for use with a writing instrument having a cap covering a nub of the writing instrument, the accessory comprising:
a body portion;
a plurality of teeth positioned circumferentially at a first end of the body portion, the plurality of teeth configured to capture a plurality of ribs situated at a first end of the writing instrument;
a coupler substantially integrated into the body portion, the coupler being removably attachable to a substantially vertically oriented writing surface; and
a receiving structure positioned at a second end of the body portion and adapted to releasably receive a portion of the cap of the writing instrument;
wherein
the plurality of teeth are adapted to be positioned within a plurality of channels existing at the first end of the writing instrument defined by the plurality of ribs;
the accessory is couplable to the writing surface along an axis substantially perpendicular to the writing surface, the coupler being adapted to permit the body portion to rotate about the axis with respect to the writing surface;
when coupled with the writing instrument, the accessory configured to cause the combination of the accessory and the writing instrument to be self-adjustable to a substantially nub-down orientation in which the nub is below a center of gravity of the writing instrument which is defined along a shaft of the writing instrument; and
the receiving structure configured such that separating the cap from the accessory requires exertion of a cap-separating force and separating the writing instrument from the accessory requires exertion of an instrument-separating force, the instrument-separating force being greater than the cap-separating force.

19. The accessory of claim 18, wherein:
the instrument-separating force is at least twice as great as the cap-separating force;
the receiving structure includes a projection that impedes attachment of the accessory to a second end of the writing instrument; and
the coupler is selected from the group consisting of a first surface-engaging structure or a second surface-engaging structure, the first surface-engaging structure including a swivel joint and a magnet and the second surface-engaging structure including a gimbal and a suction cup.

* * * * *